April 9, 1935. C. H. THAYER 1,997,324

INSULATING UNIT

Filed March 15, 1934

WITNESS:

INVENTOR
Clarence H. Thayer
BY
ATTORNEYS.

Patented Apr. 9, 1935

1,997,324

UNITED STATES PATENT OFFICE 1,997,324

INSULATING UNIT

Clarence H. Thayer, Media, Pa., assignor to Sun Oil Company, Philadelphia, Pa., a corporation of New Jersey Application March 15, 1934, Serial No. 715,784

1 Claim. (Cl. 72—36)

In the oil industry, and also in many chemical industries, it is often advisable to have refractory insulating materials in apparatus where gases, wet vapors, or oil in heated condition will come into contact with the same. Since refractory and insulating materials are of a more or less porous nature, it is impracticable to permit them to come into direct contact with heated vapors or liquids, since such vapors fill the pores of the refractory material and condense therein, or the liquids fill the pores, and thus impair the insulating value of the materials.

I have discovered that porous insulating materials may be prepared for use under the conditions above outlined, by coating the exterior surface of blocks of the material with enamel or other vitreous material such as glass. It is, therefore, an object of the present invention to provide an insulating unit which may be used in direct contact with condensible gases or vapors or liquids, corrosive or otherwise, while in either a heated or cold condition. It is also an object of the present invention to provide such an insulating unit which may be made in any shape to conform with the shape of any vessel or apparatus in which it is to be used.

A better understanding of my invention may be had by reference to the accompanying drawing, of which:

In accordance with my invention, a block of refractory material 1 is coated with a thin layer of vitreous material 2. The refractory material may be any one of a number of materials now on the market which are capable of withstanding high temperatures, and which have low coefficients of expansion, such, for instance, as blocks of magnesia, blocks of cellular gypsum, blocks of asbestos composition or diatomaceous earth which is sawn into block form in its natural state. These blocks may be covered with any enamel or vitreous composition having a low coefficient of expansion, and which is capable of being heated to high temperatures and cooled within a short period to normal temperatures without cracking.

I have found that glass of the borosilicate type forms is a very satisfactory coating for these blocks, being capable of withstanding temperatures up to 1000–1200° F., followed immediately by immersion in cold water without cracking or spalling. The blocks may be coated with the vitreous or other composition by dipping them into a bath containing the coating composition in molten form, or the coating may be applied to the blocks by spraying the blocks with the material in molten form, as, for instance, by means of an oxy-acetylene flame or an oxy-hydrogen flame.

Figure 1:
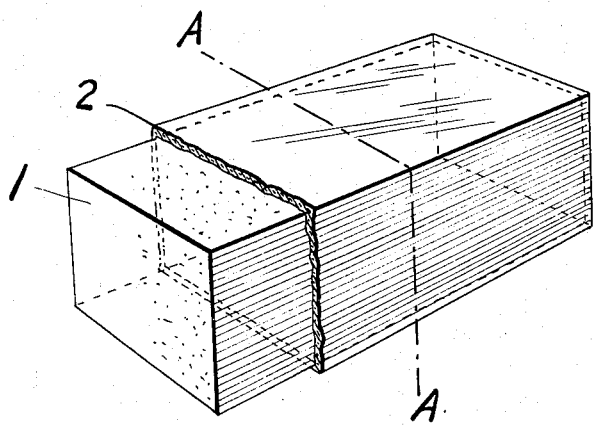
Fig. 1 is a perspective of one form of an insulating block with the outer coating partly broken away.
Figure 2:
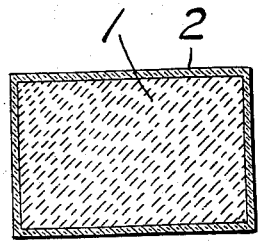
Fig. 2 is a cross section taken on line A—A of Fig. 1.
Figure 3:
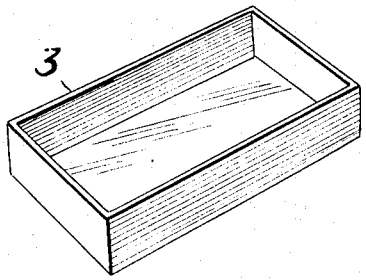
Figs. 3, 4 and 5 show modified forms of my invention.

My insulating units may also be made by blowing or pressing a thin-walled glass box 3, as shown in Fig. 3, and placing the refractory material therein, in either powder, lump, or block form. A plane glass plate may then be laid on top of the box-like glass container and its edges fused to the edges of the container.

Figure 4:
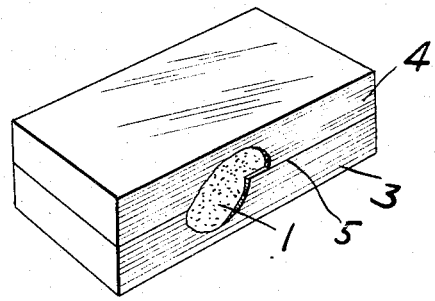
Figure 5:
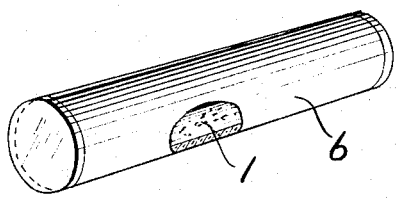

Another form my invention may take is illustrated in Fig. 4. In this modification two box-like containers 3 and 4, similar to that shown in Fig. 3 are either blown or pressed, the insulating brick is then placed in one, the other is slipped over it and the edges 5 are fused together. My invention may also be practiced by forming a tube 6 of any cross-sectional shape desired, filling lengths of the tube with refractory material and then joining end plates to the units so formed by fusing such plates to the tube edges.

While in the specification I have specified certain insulating or refractory materials which may be coated and certain materials which are suitable for use as coatings, I do not wish to be limited in my claim to these coatings. Nor do I wish to be limited to the shape of the block shown in the drawing, as the units may be made in any shape or form desired.

What I claim as new and desire to protect by United States Letters Patent is:

An insulating unit which is impervious to gases and liquids, resistant to corrosive fluids and which is capable of withstanding quick changes in temperature of the order of 1200° F. or more comprising a core of diatomaceous earth completely enveloped by a thin layer of a borosilicate glass having an extremely low coefficient of expansion.

CLARENCE H. THAYER.